(12) United States Patent
Higeta et al.

(10) Patent No.: US 7,716,033 B2
(45) Date of Patent: May 11, 2010

(54) WEB LOAD TEST PROGRAM

(75) Inventors: Tooru Higeta, Yokohama (JP);
Masayuki Ito, Yokohama (JP);
Koutarou Matsuo, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 842 days.

(21) Appl. No.: 11/512,265

(22) Filed: Aug. 30, 2006

(65) Prior Publication Data
US 2007/0288226 A1 Dec. 13, 2007

(30) Foreign Application Priority Data
Mar. 27, 2006 (JP) ............................. 2006-086330

(51) Int. Cl.
*G06F 9/45* (2006.01)
(52) U.S. Cl. ........................................ 703/22; 709/224
(58) Field of Classification Search .................. 703/22; 709/201, 217–200, 223, 224; 702/186; 714/E11.192, 714/E11.197, E11.202
See application file for complete search history.

(56) References Cited

U.S. PATENT DOCUMENTS 6,799,213 B1 * 9/2004 Zhao et al. .................. 709/224
2003/0074161 A1 * 4/2003 Smocha et al. .............. 702/186
2007/0233453 A1 * 10/2007 Ito et al. ........................ 703/26
2007/0233454 A1 * 10/2007 Ito et al. ........................ 703/26
2007/0239421 A1 * 10/2007 Matsuo et al. ................ 703/20

FOREIGN PATENT DOCUMENTS

JP 2005-332139 12/2005

* cited by examiner

*Primary Examiner*—Russell Frejd
(74) *Attorney, Agent, or Firm*—Staas & Halsey LLP

(57) ABSTRACT

A web load test program to display information about responses acquired by applying access load on a web server device as a test target is provided. The program generates a plurality of virtual web clients each of which transmits a request message to the web server device and receives a response message from the web server device in order according to a given scenario. The program stores a log information record containing an ID of the virtual web client that receives a response message and order information that shows an order of the request in the scenario corresponding to the response message into storage whenever the virtual web client receives a response message from the web server device. The program sorts the log information records that are linked with the respective response messages according to a predetermined sort condition and displays the sorted log information records onto a display.

13 Claims, 9 Drawing Sheets

Fig.5

31: First viewer screen

Figure 1:
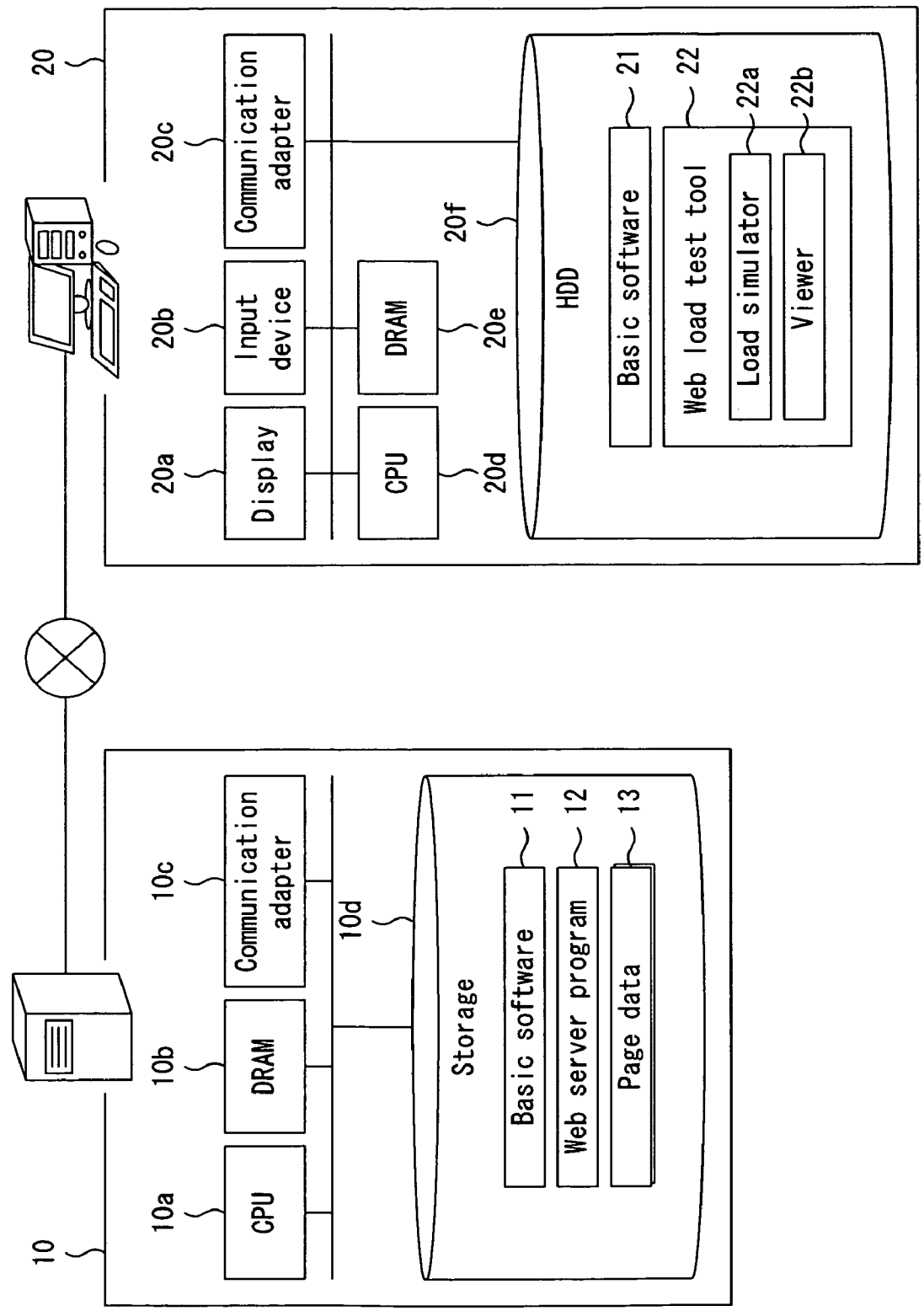

| User ID | Execution frequency | Request ID | URL |
|---|---|---|---|
| 0 | 2 | 0 | http://localhost/login.jsp |
| 1 | 1 | 0 | http://localhost/login.jsp |
| 0 | 2 | 1 | http://localhost/menu.jsp |
| 2 | 1 | 0 | http://localhost/login.jsp |
| 1 | 1 | 1 | http://localhost/menu.jsp |
| 1 | 1 | 2 | http://localhost/logout.jsp |
| 2 | 1 | 1 | http://localhost/menu.jsp |
| 0 | 2 | 2 | http://localhost/logout.jsp |
| 2 | 1 | 2 | http://localhost/logout.jsp |

Fig.6

32: Sort condition input screen

| First key (1): | User ID ▽ | 32a |
| Second key (2): | Please select item ▽ | 32b |
| Third key (3): | Please select item ▽ | 32c |

OK (32d)    Cancel (32e)

Fig.7

31:First viewer screen

| User ID | Execution frequency | Request ID | URL |
|---|---|---|---|
| 0 | 2 | 0 | http://localhost/login.jsp |
| 0 | 2 | 1 | http://localhost/menu.jsp |
| 0 | 2 | 2 | http://localhost/logout.jsp |
| 1 | 1 | 0 | http://localhost/login.jsp |
| 1 | 1 | 1 | http://localhost/menu.jsp |
| 1 | 1 | 2 | http://localhost/logout.jsp |
| 2 | 1 | 0 | http://localhost/login.jsp |
| 2 | 1 | 1 | http://localhost/menu.jsp |
| 2 | 1 | 2 | http://localhost/logout.jsp |

Fig.8

33:Double-screen display condition input screen

User ID (V):
  Left (L): 1    Right (R): 2         33a / 33b

Execution frequency (C):
  Left (L): 10    Right (R): 10        33c / 33d

OK (33e)    Cancel (33f)

Fig.10

| Web page of virtual user 1 | Web page of virtual user 2 |
|---|---|
| | |

| Request ID | URL |
|---|---|
| 1 | http://localhost/login.jsp |
| 2 | http://localhost/menu.jsp |
| 3 | http://localhost/regist.jsp |
| 4 | http://localhost/complete.jsp |
| 5 | http://localhost/logout.jsp |

Display source(V)...
Compare(D)...

Fig. 11

```
<!DOCTYPE HTML PUBLIC"-//W3C//DTD HTML 4.0
<html>
<head>
<title>Registration completion</title>
</head>
<body>

<h1>Registration procedure is completed.</h1>
<table border="1">
<tr>
<td>Registration number</td>
<td>12345</td>
</tr>
</table>

</body>
</html>
```

```
<!DOCTYPE HTML PUBLIC"-//W3C//DTD HTML 4.0
<html>
<head>
<title>Registration error</title>
</head>
<body>

<h1>Error occurs in registration procedure.</h1>
<table border="1">
<tr>
<td>Designated item number does not exist.</td>
</tr>
</table>

</body>
</html>
```

WEB LOAD TEST PROGRAM

BACKGROUND OF THE INVENTION

The present invention relates to a web load test program that is used to apply access load on a web server device and to display a result thereof.

A web load testing apparatus includes a load simulator and a viewer to observe a state of a web server device as a test target while applying a load thereto. The load simulator generates a plurality of threads that function as virtual web clients; gives scenarios, each of which defines the request order for page data in the web server device as a test target, to the generated virtual web clients; and makes the clients transmit request messages and receive response messages as defined in the scenario. Thereby, the load simulator saves the response messages that are received by the virtual web clients from the web server device, and records logs of the responses. The viewer displays a web page based on the page data in the response messages, or displays a log information list about the responses. In the log information list, each response message is represented by one log information record.

When one record is selected from the log information list, some viewers mentioned above display a web page based on page data in the response message corresponding to the selected record.

However, since the number of the logs recorded by the load simulator is huge (for example, if each of 100 virtual clients repeats the work for acquiring 10 pages by 50 times, the number of responses becomes 50,000), it is generally difficult to retrieve the log of the response received by the predetermined virtual client from the log information list of the responses listed by the viewer to display its web page.

SUMMARY OF THE INVENTION

The present invention is accomplished to solve the above-mentioned conventional problems, and the object thereof is to provide an improved web load test program, which is capable of selecting any response message of any virtual client from the log information records of responses that is listed by the viewer.

A web load test program according to the present invention is used to display information about responses acquired by applying access load on a web server device as a test target. The web load test program makes a computer function as virtual web client generation means for generating a plurality of virtual web clients each of which transmits a request message to the web server device as a test target and receives a response message from the web server device in order according to a given scenario; memory means for storing log information record containing identification information that identifies the virtual web client that receives a response message and order information that shows an order of the request in the scenario corresponding to the response message into storage whenever the virtual web client receives a response message from the web server device; result displaying means for sorting the log information records that are linked with the respective response messages according to a predetermined sort condition and for displaying the sorted log information records onto a display.

With this construction, since the log information records containing the identification information and the order information about the response massages that are received by the respective virtual web client from the web server device as a test target are sorted by the predetermined sort condition and displayed on the display, any response message of any virtual client can be easily selected.

The web load test program of a present invention may make a computer further function as page displaying means for displaying, when one or more virtual web clients are designated among the virtual web clients generated by the virtual web client generation means, the web page based on the page data in the response messages received by each of the designated virtual web clients on the display.

With this construction, the web pages that are displayed by the designated virtual web clients based on the response messages can be compared.

Therefore, according to the present invention, a user can easily select any response message received by any virtual web client among the log information records listed by the viewer.

DESCRIPTION OF THE ACCOMPANYING DRAWINGS

Figure 2:
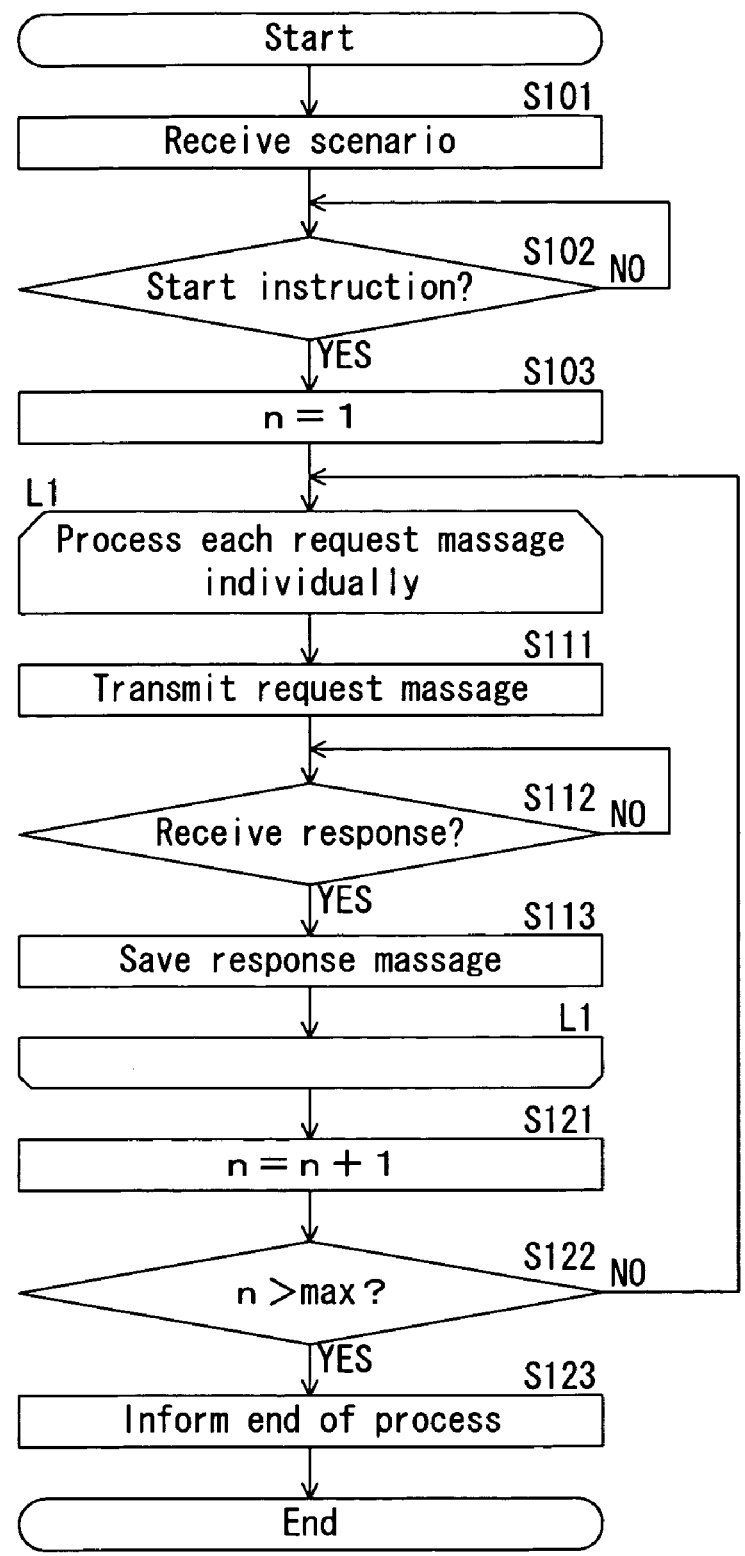
Figure 3:
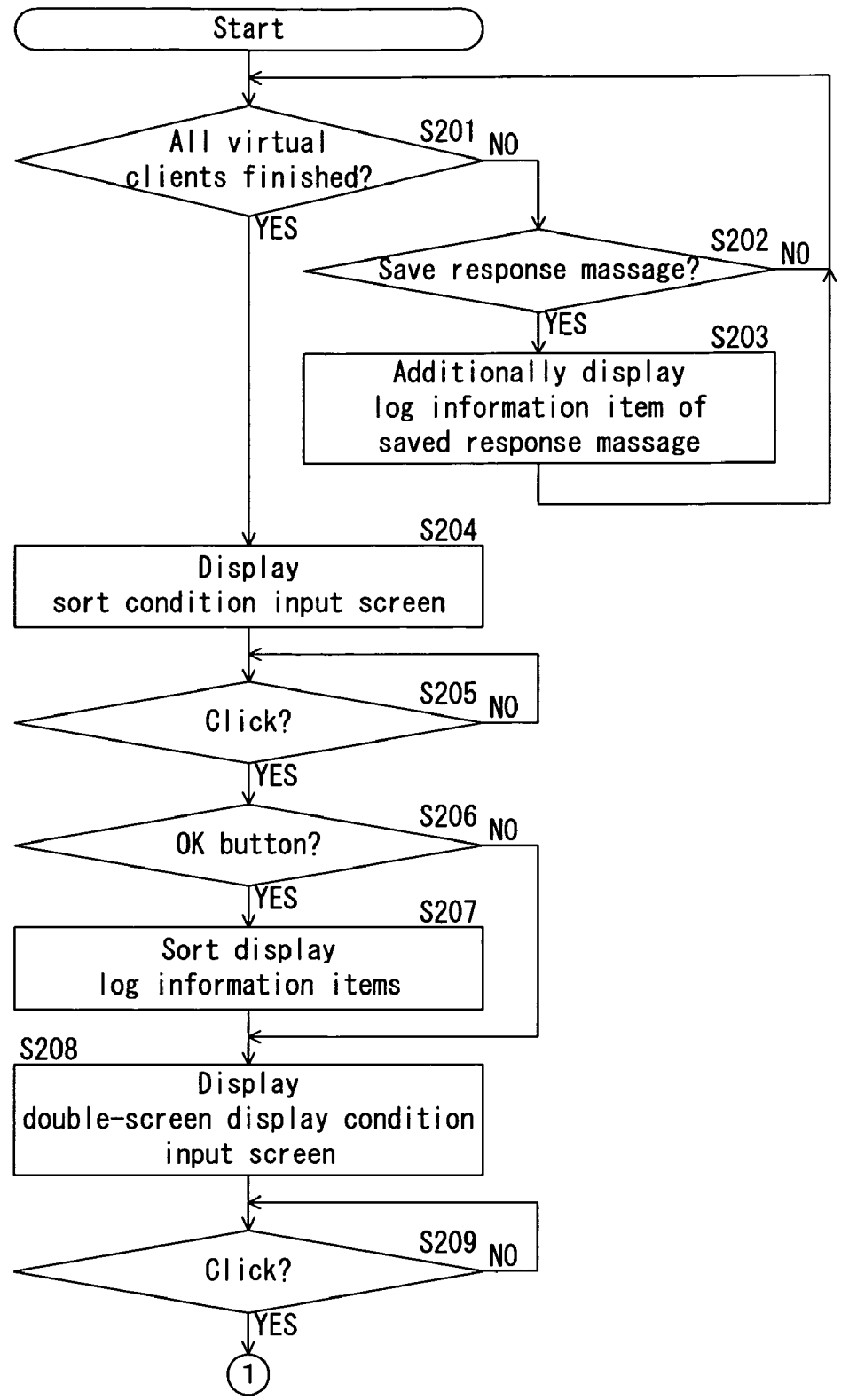
Figure 4:
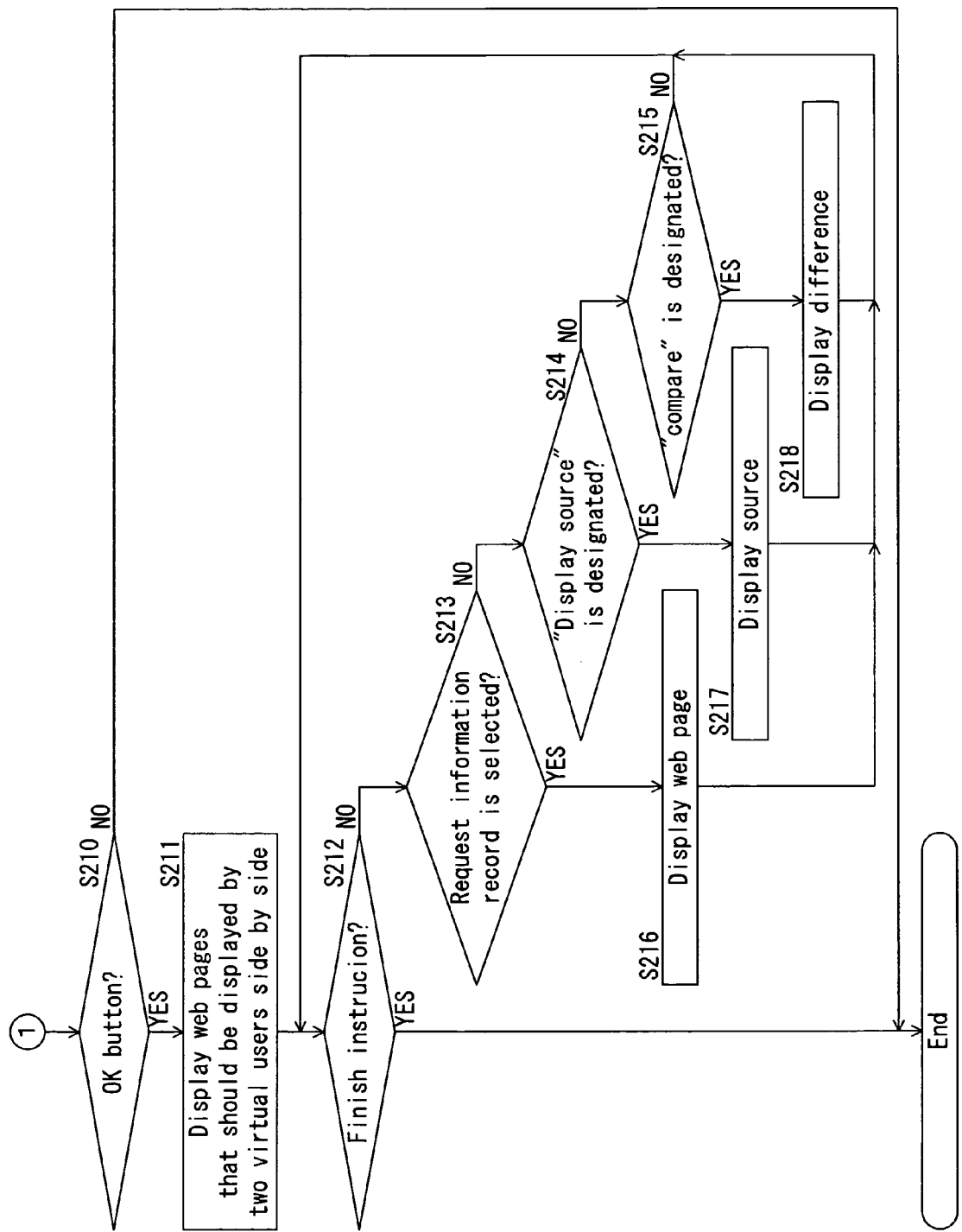
Figure 9:
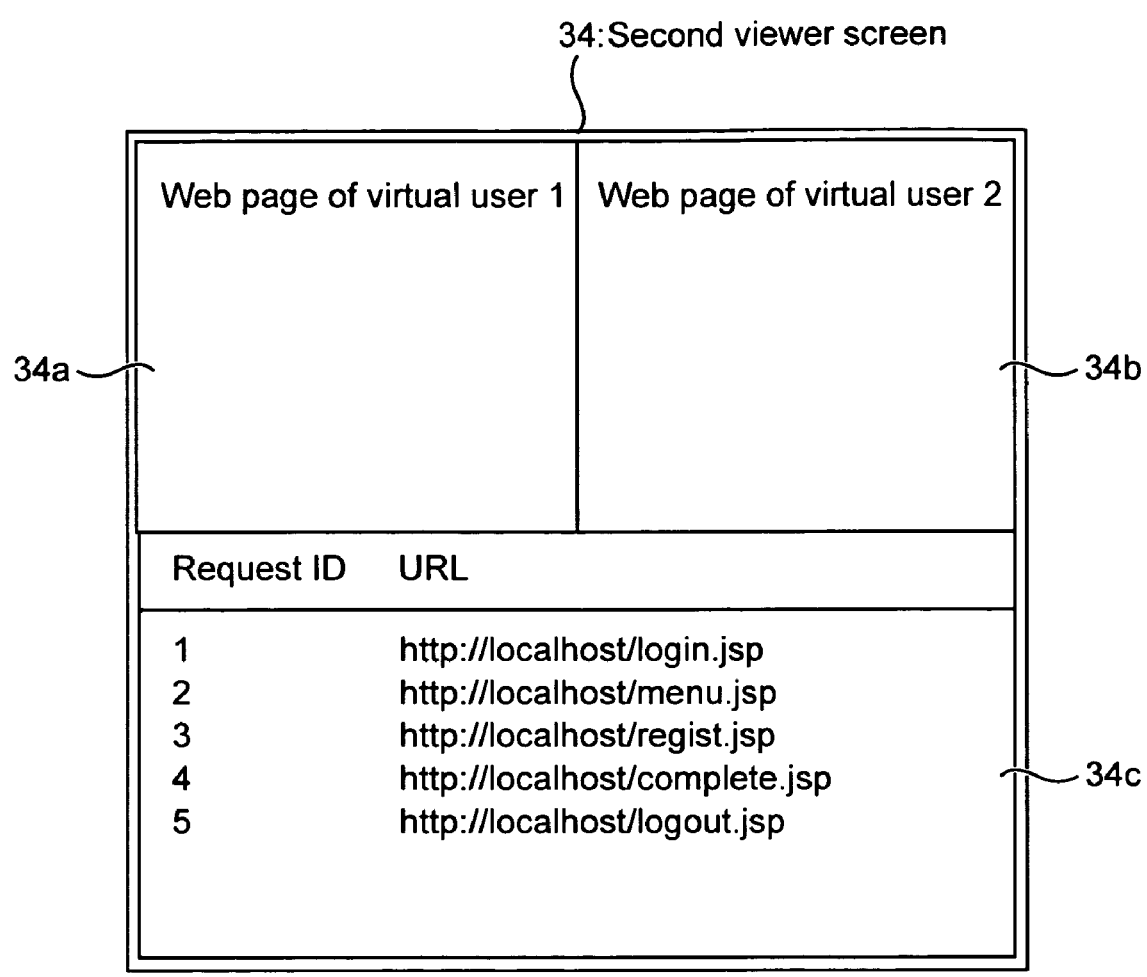

FIG. 1 is a block diagram showing a web server device that is a target of a web load test of an embodiment and a web load testing apparatus that executes the test, FIG. 2 is a flow chart showing a process executed by a thread generated as a virtual web client, FIG. 3 is a flowchart showing a first half of a process executed by a CPU according to a viewer, FIG. 4 is a flow chart showing a latter half of the process executed by the CPU according to the viewer, FIG. 5 shows an example of a first viewer screen, FIG. 6 shows an example of a sort condition input screen, FIG. 7 shows the state of the first viewer screen after sorting log information records, FIG. 8 shows an example of a double-screen display condition input screen, FIG. 9 shows an example of a second viewer screen, FIG. 10 shows an example of a dialog box including a source display instruction means and a difference display instruction means, and FIG. 11 shows an example of a dialog box including a pair of source data where different sections are highlighted.

DESCRIPTION OF THE PREFERRED EMBODIMENTS

Hereafter, an embodiment of the present invention will be described with reference to the accompanying drawings.

FIG. 1 is a block diagram showing a web server device 10 that is a target of a web load test and a web load testing apparatus 20 that executes the test according to the embodiment of the present invention.

The web server device 10 is a general purpose computer in which programs for implementing a web server function are installed. The computer that constitutes the web server device 10 contains hardware, such as a CPU (Central Processing Unit) 10a, a DRAM (Dynamic Random Access Memory) 10b, a communication adapter 10c, and storage 10d. The basic software 11, which provides fundamental functions to many pieces of application software, is installed in the storage 10d. For example, the fundamental functions include management of input/output data via the communication adapter 10c, management of memory areas of the DRAM 10b and the storage 10d, and the like. The storage 10d also stores a web server program 12 and page data 13 that makes a general purpose computer operate as a web server device.

Receiving a request from a web client device (not shown), the web server program 12 reads a requested page data from the inner storage or creates a requested page data, and transmits it to the web client device as a source of request through the communication adapter 10*c*. The page data 13 is HTML (HyperText Markup Language) source data for displaying a web page. This page data 13 may include the information that displays a link for jumping to another web page. Further, the page data 13 may include, a server side program or a client side program.

The web load testing apparatus 20 is a device for executing a web load test for the web server device 10 of a test target. This web load testing apparatus 20 is a general personal computer in which the program for implementing a web load test tool function has been installed. The personal computer that constitutes the web load testing apparatus 20 is provided with a display 20*a* such as a liquid crystal display, input devices 20*b* such as a keyboard and a mouse, and a main unit that is connected to these devices 20*a* and 20*b*. The main unit contains hardware such as a communication adapter 20*c*, a CPU 20*d*, a DRAM 20*e* and storage 20*f*. The storage 20*f* stores basic software 21.

The web load testing apparatus 20 stores a web load test tool (program) 22 that makes a personal computer operate as the web load testing apparatus. The web load test tool 22 includes modular programs (components) of a load simulator 22*a*, a viewer 22*b* and a scenario generation module 22*c*.

The load simulator 22*a* applies access load onto the web server device of a test target. Specifically, the load simulator 22*a* creates a plurality of threads that function as virtual web clients. Then the load simulator 22*a* gives a scenario, which defines request order of page data in the web server device of the test target, to the virtual web clients so that the virtual web clients execute the requests according to the scenario. As a result, the load simulator 22*a* saves response messages that are received by the respective virtual web clients from the web server device and records a log of the responses.

The CPU 20*d* that executes the load simulator 22*a* corresponds to the virtual web client creating means mentioned above.

The viewer 22*b* displays a web page based on the page data in the response message and lists the log information records of the responses.

Next, the process that is executed by a thread generated as a virtual web client in the embodiment will be described.

FIG. 2 is a flow chart showing the process that is executed by the thread generated as the virtual web client. In the first step S101 after the start of process, the thread, that is, the CPU 20*d* that executes the thread, acquires a scenario from the load simulator 22*a*. A scenario consists of some request messages that are transmitted by a virtual web client during the web load test and transmission orders thereof. Every URL (Uniform Resource Locator) in the request messages included in the scenario is assigned to the page data 13 of the web server device 10 used as a test target.

In the next step S102, the thread waits until the start instruction of the web load test is received from the load simulator 22*a*. Receiving the start indication of a web load test, the thread proceeds the process to step S103.

In step S103, the thread substitutes an initial value "1" for a variable n for memorizing the use count of the scenario, and then, it executes the first processing loop L1.

In the first process loop L1, the thread executes steps S111 through S113 in order for each of the request messages in the scenario acquired in step S101. In step S111, the thread transmits a processing target request message.

In the next step S112, the thread waits until receiving a response message as a response from the destination. Receiving a response message, the thread proceeds the process to step S113.

In step S113, the thread saves the received response message. At this time, the thread also assigns predetermined attribute information to the received response message. The attribute information includes at least a virtual web client ID (Identification), an execution frequency, a request ID, a URL, and receipt time. A virtual web client ID is identification information to distinguish each virtual web client from all the virtual web clients. An execution frequency is a substitution value of the variable n. A request ID is identification information to distinguish each request message from all the request messages in a scenario. A URL is included in a request message. Receipt time is the time when a response message is received.

After completion of the process in steps S111 through S113 for all the request messages in the scenario acquired in step S101, the thread leaves the first process loop L1 and proceeds the process to step S121.

The CPU 20*d* that executes the first process loop L1 as the thread corresponds to the memory means mentioned above.

In step S121, the thread increments the value of variable n by 1.

In the next step S122, the thread determines whether the value of variable n goes beyond a predetermined upper limit.

When the value of variable n does not go beyond the predetermined upper limit, the thread branches a process from step S122 to start the first process loop L1.

On the other hand, when the assignment value of variable n goes beyond a predetermined upper limit, the thread branches the process from step S122 to step S123.

In step S123, the thread informs the end of the access load process to the viewer 22*b* and finishes the process shown in FIG. 2.

Next, the contents of the process that is executed by the CPU 20*d* according to the viewer 22*b* in the embodiment will be described.

FIGS. 3 and 4 are flowcharts showing the process that is executed by the CPU 20*d* according to the viewer 22*b*.

In the first step S201, the CPU 20*d* determines whether the access load processes by all the virtual web clients have finished or not. That is, the CPU 20*d* determines whether the notices informing the end of the access load process have received from all the virtual web clients.

If the CPU 20*d* has received the notices informing the end of the access load process from not all the virtual web clients, the CPU 20*d* branches the process from step S201 to step S202.

In step S202, the CPU 20*d* determines whether any virtual web client saved the response message.

If any virtual web client did not save the response message, the CPU 20*d* branches the process from step S202 and returns the process back to step S201.

If any virtual web client saves the response message during execution of the process loop of steps S201 and S202, the CPU 20*d* branches the process from step S202 to step S203.

In step S203, the CPU 20*d* additionally displays the log information record of the response message that is saved by the virtual web client on a first viewer screen.

FIG. 5 shows one example of the first viewer screen 31.

As shown in FIG. 5, each of the log information records is described on each line in the first viewer screen 31. A log information record includes fields of a user ID, an execution frequency, a requests ID and a URL. A virtual web client ID is described in the user ID field, the value of variable n is described in the execution frequency field, the request ID is described in the request ID field and a URL is described in the URL field.

The CPU 20d returns a process to the process loop of steps S201 and S202, after additionally displaying the log information record to the first viewer screen 31 as shown in FIG. 5. Therefore, the log information records are listed in the order that the virtual web clients receive the response messages.

Further, if the CPU 20d has received the notices informing the end of the access load process from all the virtual web clients during execution of the process loop of steps S201 and S202, the CPU 20d branches the process from step S201 to step S204.

In step S204, the CPU 20d displays a sort condition input screen on the display 20a.

FIG. 6 shows an example of the sort condition input screen 32.

As shown in FIG. 6, the sort condition input screen 32 includes three pull-down list boxes 32a through 32c and two buttons 32d and 32e. The three pull-down list boxes 32a through 32c are used for inputting the sort conditions for the log information records in the first viewer screen 31. In any boxes, a user ID (a virtual web client ID), an execution frequency, a request ID, a URL, and receipt time can be displayed as choices. When determining the sort condition, the item selected in the upper pull-down list box has higher priority than that in the lower pull-down list box. One button 32d is an OK button that is clicked when a user wants to fix the settings in the pull-down list boxes 32a through 32c. The other button 32e is a cancel button that is clicked when a user wants to cancel the sorting of the log information records.

The CPU 20d proceeds the process to step S205 after displaying the sort condition input screen 32 as shown in FIG. 6 on the display 20a.

In step S205, the CPU 20d waits until one of the buttons 32d and 32e in the sort condition input screen 32 is clicked. When one of the buttons is clicked, the CPU 20d proceeds the process to step S206.

In step S206, the CPU 20d determines whether the OK button 32d was clicked or not.

If the OK button 32d was clicked, the CPU 20d branches a process from step S206 to step S207.

In step S207, the CPU 20d sorts the log information records listed in the first viewer screen 31 according to the sort conditions inputted in the pull-down list boxes 32a through 32c at the time of the click in step S205. FIG. 7 shows the state of the first viewer screen 31 in which the log information records have been sorted. Sorting the log information records, the CPU 20d proceeds the process to step S208.

The CPU 20d that executes step S207 corresponds to the result display means mentioned above.

On the other hand, if the cancel button 32e was clicked in step S206, the CPU 20d branches the process from step S206 to step S208, without sorting the log information records.

In step S208, the CPU 20d displays a double-screen display condition input screen on the display 20a.

FIG. 8 shows an example of the double-screen display condition input screen 33.

As shown in FIG. 8, the double-screen display condition input screen 33 includes four text boxes 33a through 33d and two buttons 33e and 33f. The first and second text boxes 33a and 33b are fields for inputting the virtual web client ID. The virtual web client whose virtual web client ID is inputted in the first text box 33a displays its web page in an upper-left frame 34a of a second viewer screen 34 shown in FIG. 9. Similarly, the virtual web client whose virtual web client ID is inputted in the second text box 33b displays its web page in an upper-right frame 34b of the second viewer screen 34 shown in FIG. 9. The third and fourth text boxes 33c and 33d are fields for inputting integers that indicate execution frequencies of the scenario. A series of processes defined in the scenario repeat a given number of times in the third text box 33c. And the result thereof is displayed in the upper-left frame 34a in the second viewer screen 34. In the same manner, a series of processes defined in the scenario repeat a given number of times in the fourth text box 33d. And the result thereof is displayed in the upper-right frame 34b in the second viewer screen 34. One button 33e is an OK button that is clicked when a user wants to fix the input values in the text boxes 33a through 33d. The other button 33f is a cancel button that is clicked when a user wants to cancel the settings of the double-screen display condition.

The CPU 20d displays the double-screen display condition input screen 33 as shown in FIG. 8 on the display 20a, and then, proceeds the process to step S209.

In step S209, the CPU 20d waits until any one of the buttons 33e and 33f in the double-screen display condition input screen 33 is clicked. When one of the buttons is clicked, the CPU 20d proceeds the process to step S210.

In step S210, the CPU 20d determines whether the OK button 32d was clicked or not.

If the cancel button 33f was clicked, the CPU 20d branches the process from step S210 and finishes the process shown in FIGS. 3 and 4.

On the other hand, when the OK button 33e was clicked, the CPU 20d branches the process from step S210 to step S211.

In step S211, the CPU 20d displays the second viewer screen 34 containing two web pages on the display 20a.

FIG. 9 shows an example of the second viewer screen 34.

As shown in FIG. 9, the second viewer screen 34 is divided into the upper frame and the lower frame. The upper frame is further divided into the upper-left frame 34a and the upper-right frame 34b. The upper-left frame 34a is used to display a web page by the virtual web client (referred to as a virtual user 1, hereinafter) whose virtual web client ID is inputted in the first text box 33a in the double-screen display condition input screen 33. The upper-right frame 34b is used to display a web page by the virtual web client (referred to as a virtual user 2, hereinafter) whose virtual web client ID is inputted in the second text box 33b in the double-screen display condition input screen 33. The lower frame is a scenario frame 34c. The scenario frame 34c shows request information records corresponding to the request messages that constitute the scenario. Each of the request information record contains a request ID and a URL that are defined in each request message. A user can select one of the request information records listed in the scenario frame 34c by a left click. When a request information record is selected by a right click, a dialog box pops up as shown in FIG. 10. The dialog box lists two instructions of "Display source (V)" and "Compare (D)" as choices. The "Display source" means an instruction for displaying the source codes of the web pages that are displayed in the upper-left frame 34a and the upper-right frame 34b, and the "Compare" means an instruction for displaying differences in the source codes of these web pages.

The CPU 20d displays the second viewer screen 34 as shown in FIG. 9 on the display 20a and displays the web page with respect to the first response message acquired in the designated time among a plurality of response messages acquired by the virtual user 1 from the web server device 10 in the upper-left frame 34a. Further, the CPU 20d displays the web page with respect to the first response message acquired in the designated time among a plurality of response messages acquired by the virtual user 2 from the web server device 10 in the upper-right frame 34b. Then, the CPU 20d proceeds the process to step S212.

The CPU 20d that executes the process in step S211 corresponds to the page display means mentioned above. In step S212, the CPU 20d determines whether a finish instruction is inputted or not.

When the finish instruction is not inputted, the CPU 20d branches the process from step S212 to step S213. In step S213, the CPU 20d determines whether any of the request information records listed in the scenario frame 34c of the second viewer screen 34 was selected or not.

When any of the request information records in the scenario frame 34c of the second viewer screen 34 was selected, the CPU 20d branches the process from step S213 to step S214.

In step S214, the CPU 20d determines whether the "Display source" instruction is designated for any of the request information records listed in the scenario frame 34c in the second viewer screen 34.

If the "Display source" instruction is not designated for any of the request information records listed in the scenario frame 34c, the CPU 20d branches the process from step S214 to step S215.

In step S215, the CPU 20d determines whether the "Compare" instruction is designated for any of the request information records listed in the scenario frame 34c in the second viewer screen 34.

If the "Compare" instruction is not designated for any of the request information records is not designated for any of the request information records listed in the scenario frame 34c, the CPU 20d branches the process from step S215 and returns the process to step S212.

When any of the request information records in the scenario frame 34c of the second viewer screen 34 is selected during execution of the process loop of steps S212 through S215, the CPU 20d branches the process from step S213 to step S216.

In step S216, the CPU 20d updates the contents displayed in the upper-left frame 34a and the upper-right frame 34b. Specifically, the CPU 20d updates the web pages displayed in the upper-left frame 34a and the upper-right frame 34b based on the page data in the response messages that are acquired by the virtual user 1 and the virtual user 2 as responses to the request messages shown by the selected request information record, respectively. Updating the contents displayed in the upper-left frame 34a and the upper-right frame 34b, the CPU 20d returns the process to the process loop of steps S212 through S215.

When the "Display source" instruction is designated during execution of the process loop of steps S212 through S215, the CPU 20d branches the process from step S214 to step S217.

In step S217, the CPU 20d displays the source codes of the page data in the response messages that are acquired by the virtual user 1 and the virtual user 2 as responses to the request messages shown by the selected request information records, respectively, in a separate dialog box. Displaying the source code of the web page corresponding to the selected request information record, the CPU 20d returns the process to the process loop of steps S212 through S215.

When the "Compare" instruction is designated during execution of the process loop of steps S212 through S215, the CPU 20d branches the process from step S215 to step S218.

In step S218, the CPU 20d displays the source codes in the same manner as in step S217 and highlights the different sections between them. FIG. 11 is an example of the dialog box including a pair of source codes whose different sections are highlighted. The CPU 20d returns the process to the process loop of steps S212 through S215, after displaying such a dialog box on the display 20a.

If the finish instruction is inputted during execution of the process loop of steps S212 through S215, the CPU 20d branches the process from step S212, and finishes the process shown in FIGS. 3 and 4.

Next, the operations and effects of the web load test tool 22 of the embodiment will be described.

When a user starts a web load test using the web load test tool 22, a user ID (a virtual web client ID), an execution frequency, a requests ID and a URL, which constitute the log information, are displayed on the first viewer screen 31 one by one (steps S201-S203).

When the web load test finishes, the sort condition input screen 32 of FIG. 6 is displayed on the display 20a. When a user wants to sort the records, the user inputs sort conditions into the pull-down list boxes 32a through 32c in the sort condition input screen 32, and clicks the OK button 32d. Then, the records are sorted according to the designated sort conditions (S205; YES, S206; YES, S207). As mentioned above, the log information records are originally listed on the first viewer screen 31 in the order of the reception of the response message by any of the virtual web clients. However, when the records are sorted as mentioned above, a user can easily select any response from any virtual web client.

After sorting or after canceling the sorting, the double-screen display condition input screen 33 shown in FIG. 8 is displayed on the display 20a. When a user wants the double-screen display, the user inputs the virtual web client ID and the numeric value into the respective text boxes 33a through 33d in the double-screen display condition input screen 33, and clicks the OK button 33e. Then, the web pages based on the response messages, which are received in the access load test of the designated time about the designated pair of virtual web clients, are displayed (S209; YES, S210; YES, S210). At the time, if a user selects any of the request information records listed in the scenario frame 34c, the web pages based on the response messages, which are acquired by the virtual web clients as responses of the request messages of the selected order in the scenario, are displayed on the upper-left frame 34a and the upper-right frame 34b (S212; NO, S213; YES, S216). Therefore, a user can easily check the received result about the focused pair of virtual web clients in the access load test by one operation to select the request information record.

If a user designates the "Display source" instruction for any of the request information records listed in the scenario frame 34c, the source codes of the web pages that should be displayed by the pair of virtual web clients according to the request messages of the designated request information record are displayed (S214; YES, S217). Further, if a user designates the "Compare" instruction for any of the request information records, the source codes of the web pages that should be displayed by the pair of virtual web clients are displayed with highlighting the different sections (S215; YES, S218). Therefore, the user can easily verify the received result about the focused pair of virtual web clients in the access load test.

What is claimed is:

1. A computer-readable medium storing a web load test program that is used to display information about responses acquired by applying access load on a web server device as a test target, said web load test program making a computer execute:

generating, with a microprocessor, a plurality of virtual web clients each of which transmits a request message to said web server device as a test target and receives a response message from said web server device in an order defined in a given scenario;

storing a log containing identification information that identifies said virtual web client that receives the response message and order information that shows an order of the request in said scenario corresponding to the response message whenever said virtual web client receives the response message from said web server device;

sorting the logs that are linked with the respective response messages according to a predetermined sort conditions; and displaying the sorted logs onto a display.

2. The computer readable medium according to claim 1, wherein said web load test program further makes the computer execute displaying, when one or more virtual web clients are designated among the virtual web clients generated by said virtual web client generating a web page based on the page data in the response messages received by each of the designated virtual web clients on said display.

3. The computer readable medium according to claim 2, wherein said web load test program further makes the computer execute listing request ID's that identify the request message which constitute said scenario, respectively, on said display in the order defined in said scenario, and displaying, when any of said request ID's listed in said display is designated, a web page based on the page data in the response message acquired by the virtual web client as a response to the request message whose request ID is designated as the web page displaying.

4. The computer readable medium according to claim 2, wherein said web load test program further makes the computer execute displaying the source codes of web pages on said display and highlighting the different sections between said source codes.

5. The computer readable medium according to claim 1, wherein said sort condition is designated by a user through an input device.

6. A computer that is used to display information about responses acquired by applying access load on a web server device as a test target, said computer comprising:

a virtual web client generation section generating a plurality of virtual web clients each of which transmits a request message to said web server device as a test target and receives a response message from said web server device in an order defined in a given scenario;

a storing section storing a log containing identification information that identifies said virtual web client that receives the response message and order information that shows an order of the request in said scenario corresponding to the response message whenever said virtual web client receives the response message from said web server device; and a result displaying section sorting the logs that are linked with the respective response messages according to a predetermined sort condition and displaying the sorted logs onto a display.

7. The computer according to claim 6, further comprising:

a page display section displaying, when one or more virtual web clients are designated among the virtual web clients generated by said virtual web client generation section, a web page based on the page data in the response massages received by each of the designated virtual web clients on said display.

8. The computer according to claim 7, further comprising a listing section listing request ID's that identify the request massages which constitute said scenario, respectively, on said display in the order defied in said scenario, and wherein said web page displaying section displays, when any of said request ID's listed in said display is designated, a web page based on the page data in the response massage acquired by the virtual web client as response to the request massage whose request ID is designated.

9. The computer according to claim 7, wherein said web page displaying section displays the source codes of web pages on said display and highlighting the different sections between said source codes.

10. A web load test method that is used to display information about responses acquired by applying access load on a web server device as a test target, said method comprising:

generating, with a microprocessor, a plurality of virtual web clients each of which transmits a request message to said web server device as a test target and receives a response message from said web server device in an order defined in a given scenario;

storing a log containing identification information that identifies said virtual web client that receives the response message and order information that shows an order of the request in said scenario corresponding to the response message whenever said virtual web client receives the response message from said web server device;

sorting the logs that are linked with the respective response messages according to a predetermined sort condition; and displaying the sorted logs onto a display.

11. The web load test method according to claim 10, further comprising displaying, when one or more virtual web clients are designated among the virtual web clients generated by said virtual web client generation step, the web page based on the page data in the response massages received by each of the designated virtual web clients on said display.

12. The web load test method according to claim 11, further comprising listing request ID's that identify the request massages which constitute said scenario, respectively, on said display in the order defied in said scenario, and wherein said displaying a web page displaying, when any of said request ID's listed in said display is designated, a web page based on the page data in the response massage acquired by the virtual web client as response to the request massage whose request ID is designated.

13. The web load test method according to claim 11, wherein said displaying a web page displays the source codes of web pages on said display and highlighting the different sections between said source codes.

* * * * *

UNITED STATES PATENT AND TRADEMARK OFFICE
CERTIFICATE OF CORRECTION

| | | |
|---|---|---|
| PATENT NO. | : 7,716,033 B2 | Page 1 of 1 |
| APPLICATION NO. | : 11/512265 | |
| DATED | : May 11, 2010 | |
| INVENTOR(S) | : Tooru Higeta et al. | |

It is certified that error appears in the above-identified patent and that said Letters Patent is hereby corrected as shown below:

Column 9, Line 22, change "generating" to --generating,--.

Column 9, Line 28, change "message" to --messages--.

Column 10, Line 6, change "massages" to --messages--.

Column 10, Line 10, change "massages" to --messages--.

Column 10, Line 11, change "defied" to --defined--.

Column 10, Line 15, change "massage" to --message--.

Column 10, Line 16, change "massage" to --message--.

Column 10, Line 45, change "massages" to --messages--.

Column 10, Line 48-49, change "massages" to --messages--.

Column 10, Line 50, change "defied" to --defined--.

Column 10, Line 53, change "massage" to --message--.

Column 10, Line 55, change "massage" to --message--.

Signed and Sealed this
Fourth Day of January, 2011

David J. Kappos
*Director of the United States Patent and Trademark Office*